Figure 1:
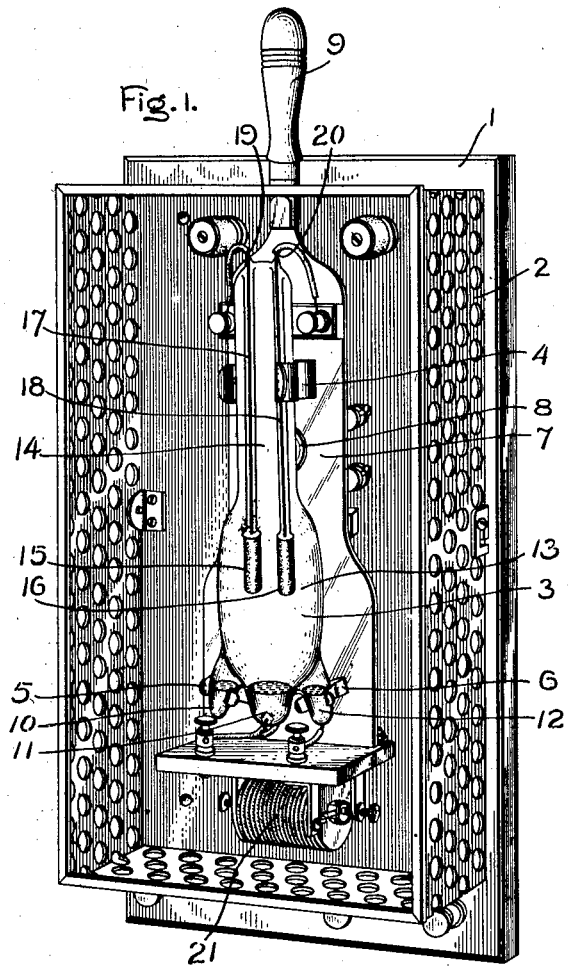

S. FERGUSON.
SYSTEM OF ELECTRICAL DISTRIBUTION.
APPLICATION FILED JULY 13, 1903.

1,103,018.

Patented July 7, 1914.
5 SHEETS—SHEET 1.

Witnesses:
George A. Thornton
Helen Orford

Inventor:
Samuel Ferguson,
by Albert H. Davis
Atty.

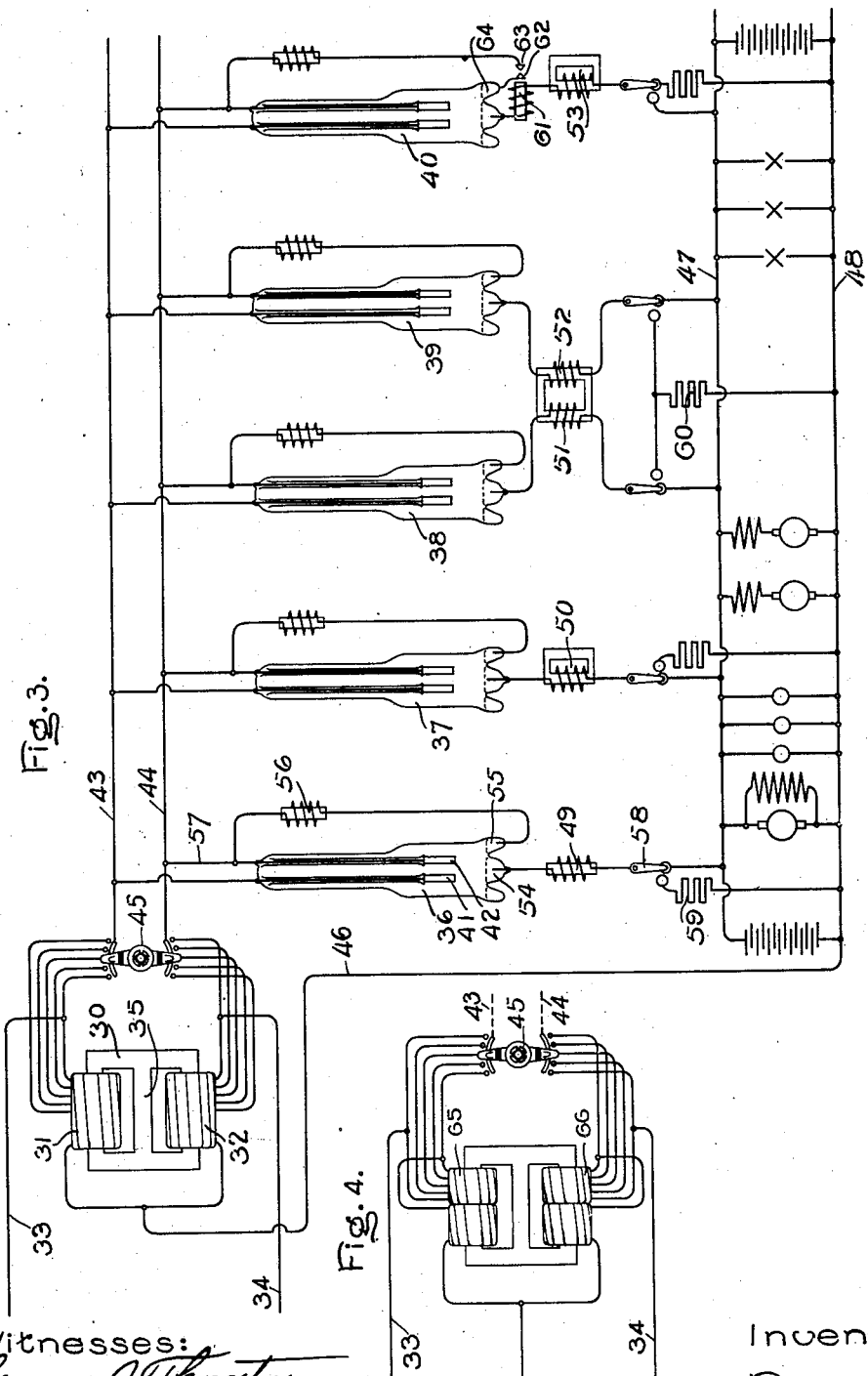

S. FERGUSON.
SYSTEM OF ELECTRICAL DISTRIBUTION.
APPLICATION FILED JULY 13, 1903.
1,103,018.
Patented July 7, 1914.
5 SHEETS—SHEET 3.
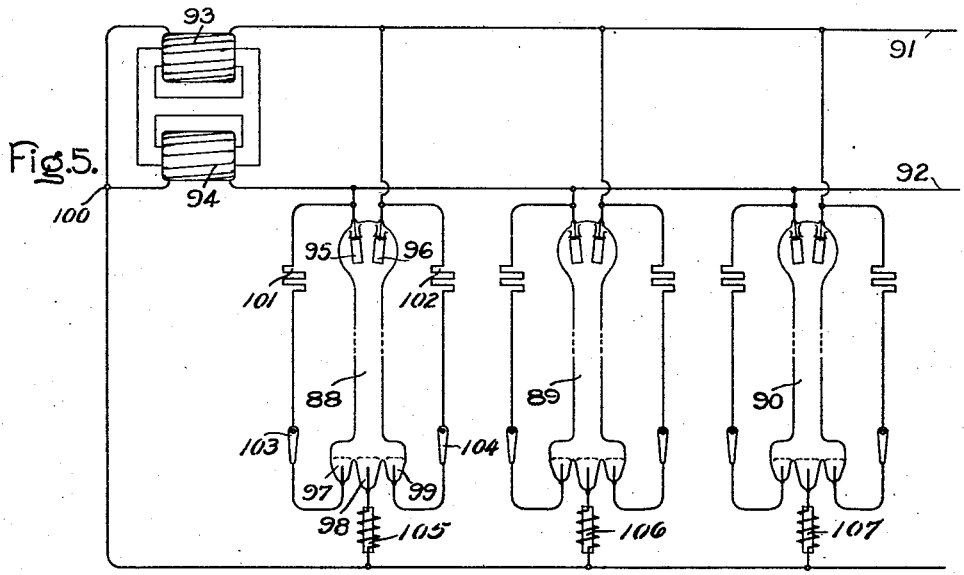
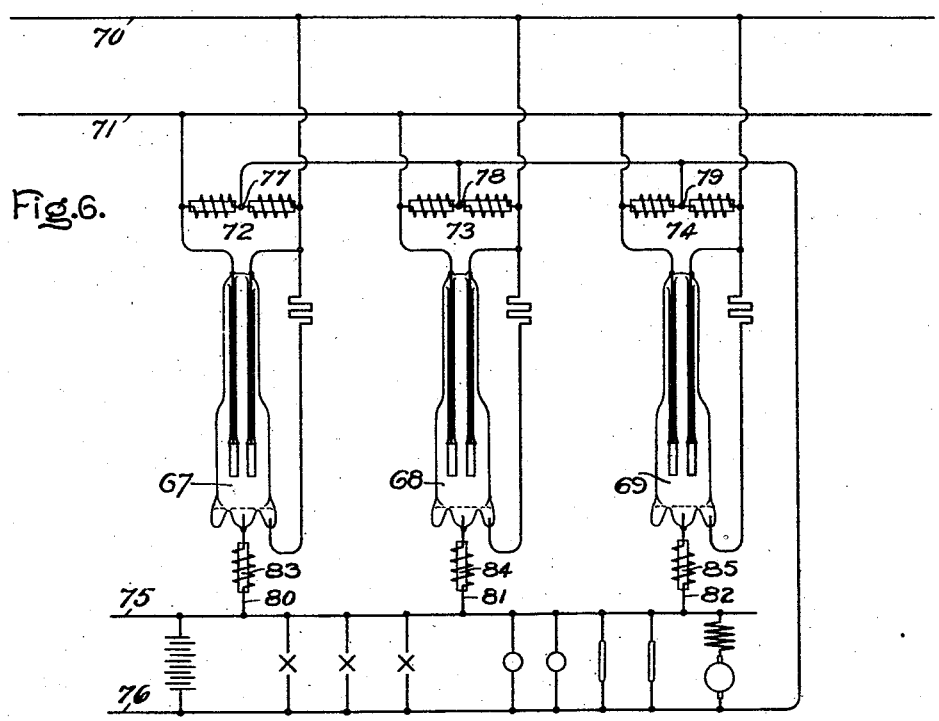
Witnesses:
George A. Thornton.
Helen Oxford.
Inventor:
Samuel Ferguson,
by Albert G. Davis
Att'y.

S. FERGUSON.
SYSTEM OF ELECTRICAL DISTRIBUTION.
APPLICATION FILED JULY 13, 1903.

1,103,018.

Patented July 7, 1914.

5 SHEETS—SHEET 4.

Witnesses:
George A. Thurston
Helen Oxford

Inventor:
Samuel Ferguson,
by Albert G. Davis,
Atty.

S. FERGUSON.
SYSTEM OF ELECTRICAL DISTRIBUTION.
APPLICATION FILED JULY 13, 1903.
1,103,018.
Patented July 7, 1914.
5 SHEETS—SHEET 5.
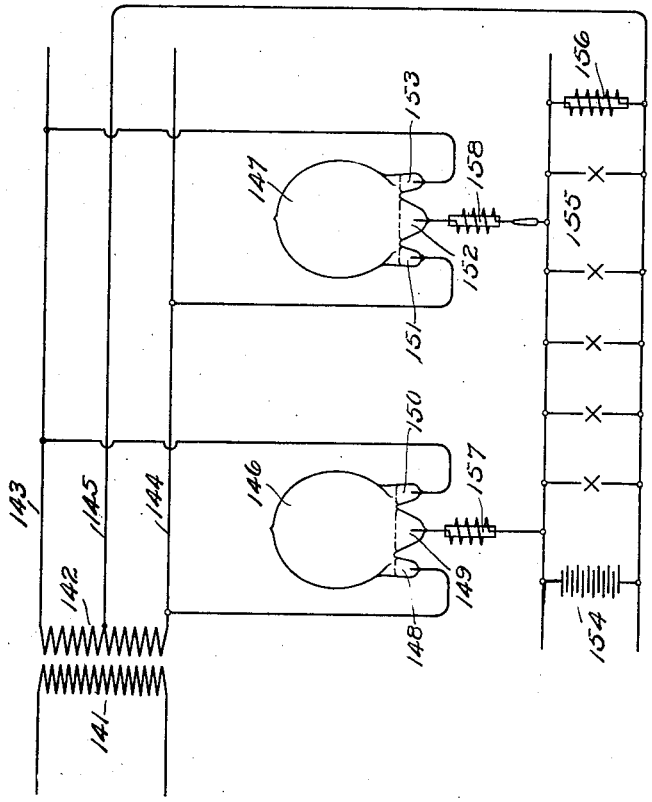
Witnesses:
George A. Thornton.
Helen Orford
Inventor:
Samuel Ferguson.
by Albert G. Davis
Att'y.

UNITED STATES PATENT OFFICE.

SAMUEL FERGUSON, OF SCHENECTADY, NEW YORK, ASSIGNOR TO GENERAL ELECTRIC COMPANY, A CORPORATION OF NEW YORK.

SYSTEM OF ELECTRICAL DISTRIBUTION.

1,103,018.      Specification of Letters Patent.      Patented July 7, 1914.

Application filed July 13, 1903. Serial No. 165,201.

*To all whom it may concern:*

Be it known that I, SAMUEL FERGUSON, a citizen of the United States, residing at Schenectady, county of Schenectady, State of New York, have invented certain new and useful Improvements in Systems of Electrical Distribution, of which the following is a specification.

My invention relates to vapor electric lamps and rectifiers and comprises certain improvements in the construction of the lamp or rectifier together with certain novel means for operating such lamps and rectifiers each in multiple with one or more of its kind.

Attempts to secure multiple operation of vapor rectifiers or lamps have heretofore been unsuccessful in those instances where the alternating current ends of the apparatus were in multiple and the direct current ends also in multiple. In such cases when a single rectifier for example is in operation, the attempt to throw another rectifier in multiple with it causes the rectifier already in circuit to cease operations as soon as the second rectifier starts. In accordance with my invention I have provided means whereby this trouble is done away with.

In one form of rectifier to which my invention is applicable, inductance coils are used for storing and restoring energy, so as to maintain a continuous flow of current in the rectifier and therefore enable it to operate, and so also as to cause both polarity waves of the alternating current to be rectified instead of waves of one polarity only. In rectifiers of this character, the inductance coils have heretofore been made with separate cores. In accordance with one feature of my invention, a single core for the inductance coils may be used thereby securing various advantages such as economy of space, economy of material, and so forth.

My invention further comprises certain other details both as to the construction of the apparatus and also as to the mode of connecting the same in circuit.

The novel features which I believe are characteristic of my invention I have pointed out with particularity in the appended claims. The invention itself, however, as to its actual construction and mode of operation, will be better understood by reference to the following description which is to be taken in connection with the accompanying drawings, in which—

Figure 2:
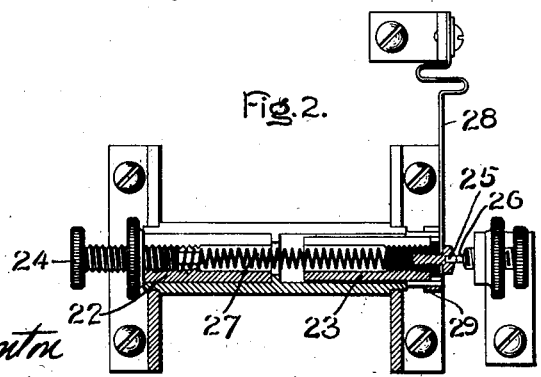
Figure 7:
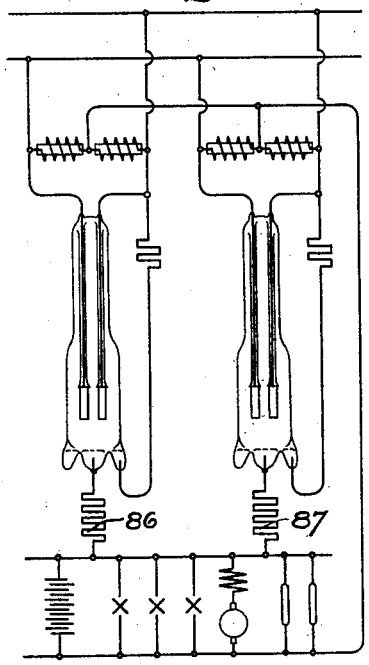
Figure 9:
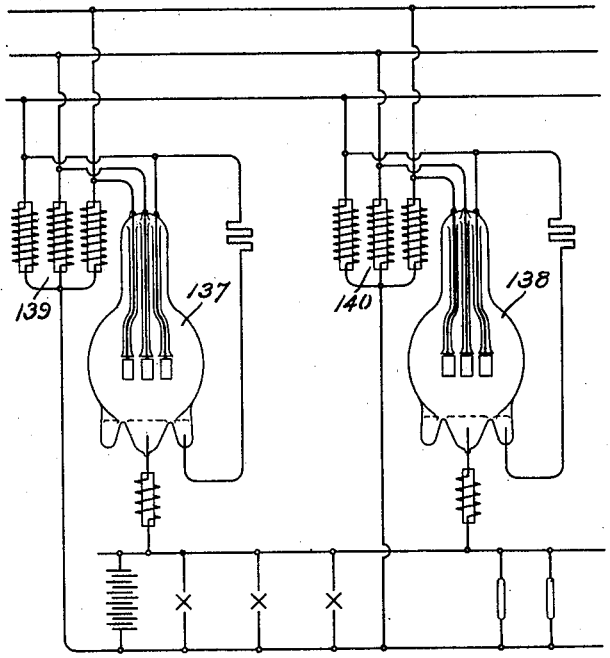
Figure 8:
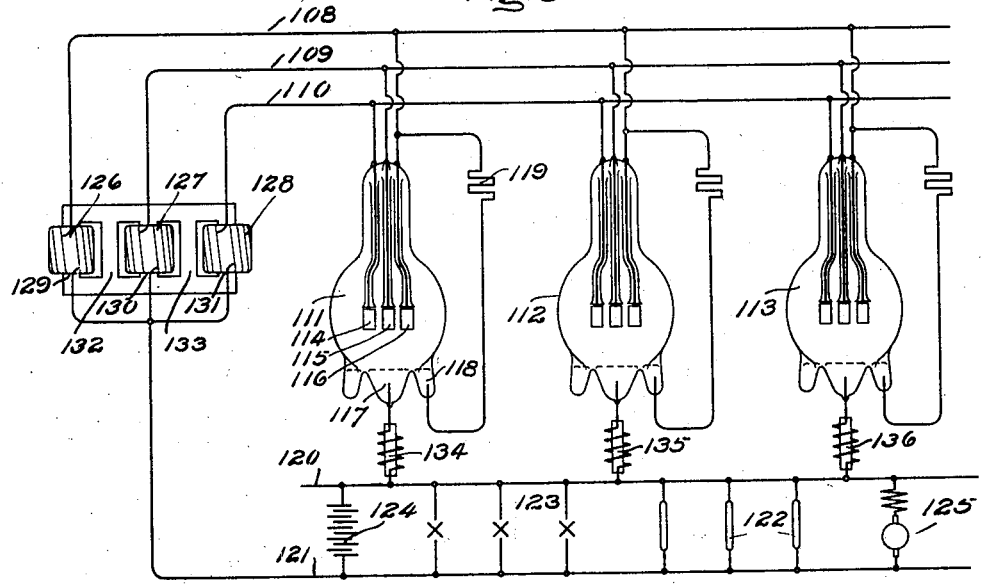

Figure 1 is a perspective view of a single rectifier embodying some of the features of my invention. Fig. 2 is a sectional view of the cut-out forming a part of the apparatus shown in Fig. 1. Fig. 3 represents a system of distribution in which a plurality of rectifiers are operated from a single set of inductance coils and are arranged with their rectified circuits as well as their alternating current terminals in multiple with each other. Fig. 4 is a modification of the arrangement of inductance coils shown in Fig. 3. Fig. 5 represents a plurality of vapor electric lamps, as distinguished from vapor rectifiers, coöperatively related to a single set of inductance coils. Fig. 6 shows a plurality of rectifiers each provided with its own set of inductance coils but with their rectified circuits connected in multiple with each other in accordance with one feature of my invention. Fig. 7 is a slight modification of the invention shown in Fig. 6. Fig. 8 shows my invention as embodied in a system in which a plurality of multiphase rectifiers are connected in multiple with each other. Fig. 9 represents a system of multiple-connected three-phase rectifiers in which each rectifier is provided with its own set of reactance coils as distinguished from the arrangement shown in Fig. 8 in which all of the rectifiers are coöperatively related to a single set of reactance coils. Fig. 10 shows my invention as applied to rectifiers of a type different from those shown in preceding figures of the drawings.

In Fig. 1 the rectifier is shown as mounted on a base 1 of slate or other suitable material and provided with a perforated metallic protecting-casing 2 having a glass cover which from its nature can not be clearly shown in the drawings. The rectifier proper is indicated at 3 and is detachably secured by asbestos-lined clips 4, 5, and 6 to a pivotally-mounted support 7. This support 7 consists of a conveniently shaped metal plate pivoted at 8 to the base 1 and provided with a handle 9 by which it may be rocked about its pivot. The individual rectifier, except as to a certain feature to be mentioned, is not of my invention and therefore requires no elaborate description. In general the rectifier consists of a highly exhausted envelop of glass or other suitable material. The shape is such as to provide pockets in the bottom portion thereof to contain bodies of mercury 10, 11 and 12, while the upper portion of the envelop is fashioned into a somewhat bulbed shape as at 13 having extending upwardly therefrom a tubular portion 14. Within the bulb 13 are located two electrodes 15 and 16, either solid or hollow, of artificial graphite or other suitable material. These electrodes are supported in position by glass-incased wires 17, 18 connected to leading-in wires 19 and 20. The graphite electrodes 15 and 16 constitute the two main anodes of the rectifier and the large body of mercury 11 the cathode. The mercury electrode 12 is a starting electrode. It may be maintained permanently in circuit or if desired may be automatically cut out when the rectifier starts. If the starting electrode is to be cut out of circuit I may make use of the cut-out indicated at 21 in Fig. 1 in which it is shown as carried by the pivoted plate 7. By mounting the cut-out as shown its weight lends stability to the pivoted member of the rectifier while at the same time its presence in juxtaposition to the rectifier enables the abolition of a number of flexible conductors which would otherwise be necessary to connect the movable member of the rectifier with the cut-out if the latter were secured to the fixed base of the apparatus. The various binding-posts serve the useful purpose of taking the strain off of the leading-in wires of the rectifiers. The cut-out shown in Fig. 1 in perspective and in cross-section in Fig. 2 is provided, as before mentioned, with the exciting coil 21. The core of the exciting coil or solenoid consists of two parts 22 and 23, the first one fixed but carrying the adjusting screw 24, and the second one movable and carrying a contact point 25 coöperating with an adjustable contact point 26. These two contact points are normally held together by means of a compression-spring 27 which urges apart the two core pieces 22 and 23. The force of the spring is adjusted by the screw 24. Current is conveyed to the movable contact 25 by means of the flexible conductor 28. The cut-out is intended to operate only when the current reaches a certain predetermined value and will remain open when the current is below that value. In furtherance of this end an iron ring 29 surrounds the end of the core 23 when the contacts 25 and 26 are together. The current in the exciting coil therefore must rise to a considerable value before the attraction of the solenoid is such as to withdraw the core from the attractive influence of the iron ring 29 and against the opposing force of the spring 27. When this withdrawal however has once taken place and the core 23 is out of the influence of the iron ring 29, and within proximity to the other portion 22 of the core, a relatively small amount of current suffices to hold the parts in this position, whence it will be seen that the current through the solenoid may decrease largely in amount below that necessary to separate the contacts 25 and 26, before the contacts can again be closed by the action of the spring 27. This allows the cut-out to open the starting circuit only when it is certain that the rectifier has started and causes the starting circuit to close only when the current in the rectifier either ceases entirely or is abnormally small.

In connecting up the rectifier shown in Fig. 1, the two electrodes 15 and 16 are connected respectively to leads extending from a source of alternating current. Across these leads two inductance coils are connected in series and the junction between them connected through a suitable consumption circuit with the main mercury electrode or cathode 11. An additional or starting mercury electrode 12 is connected through a resistance or inductance to one of the alternating current leads. By causing the mercury of the two electrodes 11 and 12 to flow together and then separate, as by rocking the rectifier on its support as indicated in Fig. 1, a circuit is established which, as the mercury separates, starts an arc which in turn causes arcs to start between the main mercury electrode 11 and the two upper electrodes 15 and 16. The starting electrode 12 having thus served its function may be cut out of circuit by means of the cut-out 21 if so desired. Inasmuch, however, as the resistance in circuit with the starting electrode permits only a small current to flow, the electrode may remain in circuit without other disadvantage than the slight loss of energy in the resistance.

Rectifiers of the character above described have heretofore been provided with separate reactances, but as shown in Fig. 3 these reactances may, if desired, be arranged with their windings on the same core. This core, which I have indicated at 30, is provided with three parallel legs connected by end pieces. On the outer legs are mounted the windings 31 and 32 which are connected in series with each other across the alternating current supply mains 33 and 34. The connections are such that the middle leg 35 of the core forms a return magnetic circuit for the fluxes developed by the two coils. Any number of rectifiers, within the capacity of the inductance coils, may be fed by coöperative connections to the inductance coils. If the rectified current from each rectifier has a separate circuit of its own no special precautions are necessary, but if it is desired that the rectifiers should be connected in multiple on their direct current sides to a common load, then I have found that special precautions must be taken, as will now be pointed out.

By way of illustration, Fig. 3 shows a number of rectifiers connected in multiple to the same load. Thus for example, of the five rectifiers shown, each consists of an exhausted envelop as indicated at 36 to 40 inclusive, which envelop is or may be of substantially the same form as that shown in Fig. 1 and, like the arrangement shown in this figure, provided with electrodes and otherwise of similar construction. In connecting up the rectifiers the two upper electrodes, as for example 41 and 42 of the rectifier 36, may be connected directly to the supply mains 33 and 34. I have found, however, that in case the voltage of the supply main is not of exactly the value to give the desired direct current voltage in the rectified circuit, the inductance coils 31 and 32 may perform the dual function of varying the voltage on the rectifier and of storing and restoring energy to maintain the rectifier in its characteristic mode of operation, the nature of which latter function it is unnecessary for me to enter into inasmuch as the rectifier, in its broader aspects, is not of my invention. For the purpose then of conveniently varying the alternating voltage on the rectifier bus-bars or conductors 43 and 44, I may connect these conductors by means of a switching device 45 which operates, as will be evident by an inspection of the drawings, to shift the connections of the conductors 43 simultaneously along corresponding points in the windings of the inductance coils 31 and 32 toward or away from the terminals connected to the main supply leads 33 and 34. The connection is similar to a compensator with voltage adjusting taps. Each of the rectifiers 37 to 40 inclusive is connected to the bus-bars 43 and 44 in the same way as the rectifier 36. The main mercury electrode of each of the rectifiers is connected through a consumption circuit to a lead 46 extending to the junction between the two inductance coils 31 and 32. Each of the rectifiers may as before mentioned have its own consumption circuit but if on the other hand it is desired that the rectifiers should supply a common load, as for example that represented by the various translating devices comprised between the conductors 47 and 48, then the connection of each of the main mercury electrodes of the rectifiers must be made to the load through what I may term a steadying device which may consist of an inductance or a resistance. In Fig. 3, however, I have represented the respective rectifiers as provided with steadying devices consisting of reactances 49 to 53 respectively, rather than resistances. The reactance 49 is indicated for example as having an open magnetic circuit, while the other reactances are provided with cores having closed magnetic circuits.

In starting into operation the system shown in Fig. 3 the rectifiers may be started one after the other. A description of the starting of one will therefore suffice for all.

Referring more particularly to the rectifier 36 it will be noted that at the bottom portion of the envelop are two mercury electrodes 54 and 55 to correspond respectively to the electrodes 11 and 12 in Fig. 1. The electrode 54 is the main electrode from which the rectified current is derived and is connected directly to the circuit including the steadying device 49. The additional or starting electrode 55 is connected through a resistance or inductance 56 to one of the alternating current supply leads as for example the lead 57. In starting the rectifier the switch 58 is thrown so as to connect the direct current circuit of the rectifier through a starting resistance 59 to the lead 46 extending back to the inductance coils 31 and 32. When the starting arc in the rectifier is sprung by rocking the rectifier, or otherwise bringing the mercury of the two electrodes 54 and 55 into momentary contact, the main arcs between the electrode 54 and the two upper electrodes 41 and 42 immediately follow and the rectifier is in operation. When this is done the switch 58 may be thrown into the position indicated in Fig. 3 thereby connecting the rectifier directly across the circuit of the load. This operation may, however, be deferred until all of the rectifiers have been started into operation through their respective starting resistances. In the case of the rectifiers 38 and 39, a common starting resistance 60 is used to start both rectifiers. If desired, a single starting resistance might be used for starting the entire set of rectifiers, one after the other.

In connection with the description of the rectifier 36, it has been assumed that the starting circuit including the resistance 56 remains closed during the operation of the rectifier. The current in the starting circuit is unidirectional and, inasmuch as it flows through the load, is not lost. There is, however, a certain though not considerable loss of energy in the resistance 56. To do away with this the cut-out heretofore described may be used, as diagrammatically indicated for example in connection with the rectifier 40. In this case the winding 61 of the cut-out, which corresponds to the winding 21 in Fig. 1, is connected in the direct current circuit of the rectifier and operates to separate the two contacts 62 and 63 in the circuit of the starting electrode. These contacts 62 and 63 correspond to the contacts 25 and 26 in Fig. 2 while the starting electrode 64 in Fig. 3 corresponds to the starting electrode 12 in Fig. 1. The connections of the cut-out just described, represent the connections of the cut-out which is shown in detail views in Figs. 1 and 2.

In Fig. 3 the taps in the windings of the inductance coils 31 and 32 are so brought out and the connections to the supply mains 33 and 34 and the rectifier bus bars 43 and 44 so made that the voltage on the bus bars may be made equal to or less than that on the supply mains 33 and 34. If it is desired to make the voltage on the bus bars greater than that on the supply mains, or in other words to step up the voltage, then the connections may be altered as shown in Fig. 4, which differs from the corresponding portion of Fig. 3 in that a portion of each inductance coil, as at 65 and 66 is reversed with respect to the remainder of the inductance coils while the connections to the supply mains 33 and 34 are made so as to include all the coils in series. When the switch 45 is placed so as to connect the bus bars 43 and 44 to the supply mains 33 and 34, the voltage is the same on the two sets of mains. When, however, the switch is turned so as to move the leads or busbars 43 and 44 farther from the main lines 33 and 34 thus inserting one or more of the coil sections 65 and 66 between the mains and the rectifier circuit, the voltage on the rectifier will be increased above that of the mains according to the number of sections so inserted, the voltage of each being added to that of the source of supply.

In the arrangement shown in Fig. 3, the rectifiers are shown connected in multiple on their direct current ends and with their alternating current leads in multiple across a single set of inductance coils. If desired, however, the rectifiers may each be provided with its own set of inductance coils as indicated by way of illustration in Fig. 6. Each of the rectifiers 67, 68 and 69 is connected with the alternating current supply mains 70 and 71 and each is provided with its own set of inductance coils as indicated at 72, 73 and 74. The common load supplied by the rectifiers is indicated by translating devices of any desired character joined to the consumption circuit represented by the mains 75 and 76. One of these mains, as for example the main 76, is connected by a suitable lead, as indicated, to the junctions between the inductance coils of each set 72, 73 and 74, the points of connection being indicated at 77, 78 and 79. The other main 75 is connected with the rectifiers in each instance by a lead including a steadying device. These leads are indicated at 80, 81 and 82 and their steadying devices in this instance consist of inductance coils represented at 83, 84 and 85. The rectifiers shown in Fig. 6 are provided with starting devices, switches, and so forth, such as shown in Fig. 3, but in view of the description of the latter figure no further explanation as to these features in Fig. 6 is deemed necessary.

The arrangement shown in Fig. 7 is essentially the same as that shown in Fig. 6 except, however, that the steadying devices 86 and 87 are formed respectively of resistances instead of inductances as at 83 in Fig. 6.

The foregoing description has been limited to the consideration of vapor rectifiers. My invention, however, renders it possible, from a single set of reactance coils, to accomplish multiple operation of vapor electric lamps of a type resembling the rectifiers. Thus in Fig. 5 are shown a plurality of alternating current lamps 88, 89 and 90 supplied from the alternating current leads 91 and 92, to which a single set of inductance coils 93, 94 is connected. This set of inductance coils is similar to the set shown in Fig. 3 except that for convenience of illustration it is shown as unprovided with voltage adjusting means which, in the case of lamps, would not ordinarily be necessary. The lamps shown are all of the same type so that a description of one will therefore suffice for all. Referring then to the lamp 88 it will be seen to consist of an exhausted envelop of suitable length provided at the top with an enlargement so as to accommodate the electrodes 95 and 96, of artificial graphite or other suitable material, and provided at the bottom with adjacent pockets for containing bodies of mercury or other vaporizable material 97, 98 and 99 constituting electrodes. The middle electrode 98 is a main electrode which when the lamp is operating coöperates with the two upper main electrodes 95, 96. The two electrodes 97 and 99 on either side of the electrode 98 are starting electrodes. The lamp is put in circuit by connecting the upper electrodes 95 and 96 across the alternating current supply mains 91 and 92, while at the same time a circuit is extended from the lower main electrode 98 to the junction 100 between the two inductance coils 93 and 94. In order to start up the lamp, the starting electrodes 97 and 99 are connected across the supply mains 91 and 92, with current limiting devices such as resistances or inductances 101 and 102 in their circuits as shown. By shaking the lower end of the lamp or by other means causing the mercury of the two starting electrodes to come into contact with the main electrode 98 and separate therefrom, two starting arcs are produced which although pulsating in character so overlap each other that whenever one of the arcs is not flowing the other arc is in existence. The arcs thus mutually sustain each other and keep up a continuous current flow in the envelop. The seat of operation of these arcs is transferred to the main tube by opening the switches 103 and 104 whereupon the arcs desert the starting electrodes and pass to the main electrodes 95, 96.

In order that the lamps shall run together in multiple from the same reactance coils, a steadying device, such as an inductance or resistance, is connected in circuit with each in a manner similar to the connection of such devices in the circuits of the rectifiers as heretofore described. Thus the steadying device for the lamp 88 is indicated at 105 while for the other lamps steadying devices are indicated at 106 and 107. The circuits of the respective lamps, after passing through the respective steadying devices are connected to the common conductor which extends to the junction 100 of the reactance coils.

The foregoing description has been confined more especially to an explanation of some of the applications of my invention to apparatus adapted for the use of single phase alternating currents. It is to be understood, however, that my invention is also applicable to multiphase alternating currents of any desired number of phases. Figs. 8 and 9 by way of example illustrate the application of my invention to a three-phase system of alternating current.

In Fig. 8 the three-phase mains are indicated at 108, 109 and 110. Across these mains are connected in multiple any desired number of three-phase rectifiers, three of which are indicated at 111, 112 and 113. These rectifiers resemble the single phase rectifiers already described except for the difference that instead of two cylindrical electrodes contained in the enlarged portion of the envelop, I provide three to correspond in number with the number of supply mains. Thus in the rectifier 111 the three electrodes are indicated at 114, 115 and 116. These electrodes are connected across the supply mains as clearly shown. Coöperating with these electrodes is the main mercury electrode 117, while adjacent to this electrode is the starting electrode 118 connected through a current-limiting device 119 to one of the supply mains. The construction of the other rectifiers is the same as that of the one described and therefore requires no further explanation. The consumption circuit, which is to be supplied jointly by the rectifiers, is represented by the mains 120 and 121, between which translating devices of any suitable character varied or otherwise, may be connected. Thus, for example, direct current vapor lamps are indicated at 122, other lamps at 123, a storage battery at 124, a motor at 125, and so forth. One of the mains of the consumption circuit, as for example the main 121, is connected to the junction of the three inductance coils 126, 127 and 128 which are Y-connected between the three supply mains 108, 109 and 110. The cores of these inductance coils may be separate, if desired, though I find that certain advantages, such as saving in material, in economizing space and the like, may be secured by mounting the coils on a single core as I have indicated in the drawing. This core consists of a number of legs connected by end pieces. Three of the legs, as 129, 130 and 131, are surrounded by the inductance coils, while the remaining legs 132 and 133 furnish return magnetic circuits for the fluxes induced by the coils. The other main 120 of the consumption circuit is connected to each of the rectifiers by circuits each of which contains a steadying device, indicated at 134 in the case of the rectifier 111, and, in the cases of the other two rectifiers, at 135 and 136. The system may be started up by the use of starting resistances in the same manner as described in connection with Fig. 3 but, for the purpose of avoiding unnecessary complication in the drawings, the illustration of such starting resistances, coöperating switches, and the like, has been omitted.

Fig. 9 differs from Fig. 8 in that it represents a number of rectifiers each fed from its own set of reactance coils as distinguished from the showing in Fig. 8 in which a plurality of rectifiers are all fed in common from a single set of inductance coils. Thus in Fig. 9 the two rectifiers 137 and 138, shown as representative of any desired number of rectifiers, coöperate respectively with the sets of Y-connected inductance coils 139 and 140. These inductance coils, unlike the set of inductance coils shown in Fig. 8, have separate cores. Otherwise than as described, the arrangement shown in Fig. 9 is the same as that shown in Fig. 8.

In Fig. 10 I have represented my invention as applied to rectifiers of a form differing from those shown in previous figures of the drawing. In Fig. 10 the source of current supply is represented as single phase and the supply system is such that a neutral conductor may be derived therefrom. For this purpose any one of a number of different arrangements may be utilized but by way of illustration I have represented a transformer having a primary 141 and a secondary 142. Mains 143 and 144 extend from the outside terminals of the secondary, and a neutral conductor 145 from a point in the winding of intermediate potential. From these mains any number of rectifiers may be operated in multiple in accordance with my invention. In the drawings I have represented but two rectifiers, though it will be understood that any desired number may be used. These rectifiers are indicated at 146 and 147. Each rectifier consists as shown of an exhausted receptacle provided with a number of pockets containing bodies of mercury constituting electrodes. In the rectifier 146 the mercury bodies are indicated at 148, 149 and 150 while in the rectifier 147 they are indicated at 151, 152 and 153. In each instance suitable leading-in wires are provided for making electrical connections with the electrode. Each rectifier has two of its electrodes, as for example the electrodes 148 and 150 in the rectifier 146, connected to the two mains 143 and 144. The remaining electrode 149 is connected to a consumption circuit leading to the neutral conductor 145. This consumption circuit may include translating devices of any desired character such for example as a storage battery 154, lamps 155, or the like. In shunt with these translating devices is an inductance coil 156, the purpose of which is to cause the waves of current flowing in the rectifier or rectifiers to lag more or less behind their electro-motive forces. Under these conditions an arc always exists in the rectifier at the time the electro-motive force is passing through zero and as it commences to rise in the opposite direction. The arc due to the preceding wave therefore serves as a starting means for the succeeding wave, thereby maintaining the rectifier in operation. If a single rectifier alone is used, the inductance coil 156 in shunt to the load is all that is necessary to maintain the rectifier in operation. When, however, a number of rectifiers are to be operated in multiple, I connect in series with the lead extending from each to the common load, an inductance coil indicated at 157 in the case of the rectifier 146 and at 158 in the case of the rectifier 147. These inductance coils prevent the interference of each of the rectifiers with the other or others and enable the rectifiers to work together in parallel which they otherwise would be unable to do. Instead of the inductance coils 157 and 158 I may, if desired, substitute ohmic resistances.

In the foregoing description I have set forth in detail various embodiments which my invention may assume in practice. It is to be understood, however, that many variations thereof may be made without departing from the spirit of my invention, for which reason I do not wish to be limited to the exact details shown and described.

What I claim as new and desire to secure by Letters Patent of the United States, is,

1. The combination of alternating current supply mains, inductance coils connected respectively to the supply mains and joined together at a common point, and a plurality of vapor electric conductors having electrodes connected some to the supply mains and some in multiple to a circuit leading to said common point.

2. The combination of alternating current supply mains, a plurality of inductance coils connected to said mains and located on a single magnetic core, the magnetic circuit of one coil being non-identical with that of another coil, and a vapor electric lamp or rectifier connected to said mains and to said inductance coils.

3. The combination of a vapor rectifier, a load which is to be supplied with rectified current, a starting resistance, and a switch for connecting the resistance first in circuit with the rectifier, then connecting the load in multiple with the resistance, and then cutting out the resistance.

4. The combination with a vapor electric device, of a set of inductance coils mounted on the same core and each provided with a magnetic circuit non-identical with that of another of said coils, and connections between said vapor device and said set of inductance coils.

5. The combination of a plurality of exhausted envelops each provided with a cathode and a plurality of anodes, single phase supply mains, connections from the anodes of each envelop across said supply mains, a return conductor extending from said single phase system, and a circuit including an inductance coil, extending from each cathode to said return conductor.

6. The combination of a plurality of single phase rectifiers each provided with a plurality of anodes and a cathode, a reactance in the direct current circuit of each rectifier, and connections for supplying the direct current of each rectifier to a common load and for causing the direct current from each rectifier to flow first through its own reactance before passing to the common load.

7. The combination of a plurality of single phase rectifiers each having a cathode and a plurality of anodes, a reactance in the direct current circuit of each rectifier for producing an overlap in the current waves flowing in the rectifier, and a multiple connection for the direct current circuits of the rectifiers joining these circuits together at that side of each reactance opposite the side connected to the corresponding rectifier.

8. The combination of a plurality of single phase vapor electric devices each having a cathode and a plurality of anodes, a reactance connected to the cathode lead of each device, and a junction between the reactances such that each reactance is interposed between the junction and its corresponding cathode lead, whereby the arcs in each vapor device are caused to overlap and whereby the several vapor devices operate in multiple with each other.

9. The combination of a plurality of exhausted envelops each provided with a cathode and a plurality of anodes, single phase supply mains, connections from the anodes of each envelop across said supply mains, a winding excited from said single phase system, and a circuit including an inductance coil, extending from each cathode to an intermediate point on said winding.

10. The combination of a plurality of single phase rectifiers each provided with a plurality of anodes and a cathode, a reactance in the direct current circuit of each rectifier for producing an overlap in the current waves flowing in the rectifier, and connections for supplying the direct current of each rectifier to a common load and for causing the direct current from each rectifier to flow first through its own reactance before passing to the common load.

In witness whereof, I have hereunto set my hand this 11th day of July, 1903.

SAMUEL FERGUSON.

Witnesses:
 BENJAMIN B. HULL,
 HELEN ORFORD.